United States Patent [19]

Shaw

[11] Patent Number: 5,134,729
[45] Date of Patent: Aug. 4, 1992

[54] UNIVERSAL POSITIVE SHUT OFF, METERED WATER CONTROL SYSTEM FOR USE WITH FLUSH TOILET TANKS

[76] Inventor: William S. Shaw, 7606 Silvercrest Cir., Austin, Tex. 78757

[21] Appl. No.: 404,516

[22] Filed: Sep. 8, 1989

Related U.S. Application Data

[63] Continuation-in-part of Ser. No. 298,029, Jan. 19, 1989, Pat. No. 4,916,762.

[51] Int. Cl.⁵ .................................................. E03D 1/00
[52] U.S. Cl. ........................................... 4/415; 4/366; 137/436
[58] Field of Search ................... 4/366, 415, 353, 428, 4/421; 222/16, 14, 20, 59, 71, 72; 251/15, 230, 251, 249.5; 137/386, 436, 437, 441

[56] References Cited

U.S. PATENT DOCUMENTS

| | | | |
|---|---|---|---|
| 1,142,620 | 6/1915 | Radcliff | 137/441 |
| 1,145,791 | 7/1915 | Pigott | 222/59 |
| 1,407,752 | 2/1922 | Johns | 222/59 |
| 1,552,261 | 9/1925 | Belcher | 222/59 |
| 1,809,440 | 6/1931 | Elder | 222/59 |
| 3,086,546 | 4/1963 | Brown | 137/436 |
| 3,902,201 | 9/1975 | Bobo | 4/366 |
| 3,940,805 | 3/1976 | Sievers | 251/15 |
| 4,145,775 | 3/1979 | Butler | 4/415 |
| 4,280,530 | 7/1981 | Yi | 137/624.11 |
| 4,335,852 | 6/1982 | Chow | 239/68 |
| 4,624,444 | 11/1986 | Johnson | 251/121 |
| 4,633,905 | 1/1987 | Wang | 137/624.11 |
| 4,708,264 | 11/1987 | Bruninga | 222/20 |

*Primary Examiner*—Linda J. Sholl
*Attorney, Agent, or Firm*—Penrose Lucas Albright

[57] ABSTRACT

A device for metering the flow of water into the tank and bowl of any currently known tank toilet and providing a positive shut-off of the flow. When the toilet handle is turned, a linkage rotates a cam to force a stopper from its seat thereby commencing water flow. Water flows through a flow channel to be directed by a flow nozzle past a water wheel imparting a rotation thereto. The water wheel is gearably linked to the cam thereby rotating the cam. When the cam has rotated to position a cam repeat over the stopper stem, the stopper is reseated by the pressure of the water and water flow ceases. The distribution of flowing water between tank and bowl can be changed by altering the structure of a bowl fill assembly. The bowl fill assembly and a tank fill tube are attached to the outlet by a right angle manifold. The amount of water flow permitted is a function of the number of cam notches and flow nozzle size.

9 Claims, 8 Drawing Sheets

UNIVERSAL POSITIVE SHUT OFF, METERED WATER CONTROL SYSTEM FOR USE WITH FLUSH TOILET TANKS

This application is a Continuation-in-Part of application Ser. No. 07/298,029 filed Jan. 19, 1989 now U.S. Pat. No. 4,916,762 issued Apr. 17, 1990.

BACKGROUND OF THE INVENTION

The present invention relates to a universal positive shut-off system to control the quantity of water used to flush tank toilets of the kinds normally found throughout the world.

Toilet systems, of the types almost universally installed in American homes, are connected to the potable water supply. The average American home has from one to three of these toilets, each of which uses approximately three and a half gallons, or more, of water per flush. The majority of these toilets operate by means of a flotation device attached to a water flow valve. When the toilet is flushed, a chain connected to the flush handle lifts a stopper opening an outlet in the bottom of the toilet tank. The water from the tank flows into the toilet bowl raising the level of water therein. When the water in the toilet bowl exceeds the height of the bowl drain, water flows from the bowl by a siphoning effect which suctions out all water and waste in the toilet bowl. During this period of time, the flotation device, that was floating on the water in the tank, drops as the tank water level drops, thereby opening a water inlet valve. When all water has exited the tank, the stopper falls closing the open outlet. Water now entering the tank, through the inlet valve, fills the tank. As the water level rises the float rises until the water valve is closed.

This system is effective, simple and relatively efficient. However, it can also be extremely wasteful. Should the stopper that closes the tank outlet wear, or become distorted, a leak occurs that allows water to flow constantly into the toilet bowl. Should enough water escape the tank, the float drops opening the water inlet valve to replace the lost tank water. Conversely, the inlet valve is subject to distortion and/or a buildup of minerals, particularly in hard water areas, that interfere with its efficient operation to the point where it will never completely close. The same result may occur from improper adjustment of the flotation device. In these latter cases, there is a constant flow, however small, of water into the tank. To preclude flooding, an overflow tube in the tank carries excess water into the toilet bowl. Thus in currently conventional toilet tanks, the level of water in the tank never exceeds the height of the overflow tube. The amount of water that may be introduced into the tank at any given time is less than the capacity of the overflow tube permits to remove. However, this continual flow also leads to a waste of water.

Potable water, or fresh water, and its availability is becoming a significant concern. Changing weather patterns, increased agricultural needs, the cutting of woods and forests, and the increasing destruction of water sheds and lowering of water tables in many areas have reduced the quantity of fresh water available. These factors, combined with population growth, have created severe strains on the ability of both nature and man to supply the necessary potable water. It is not uncommon for local water to be rationed during peak water use periods. The problem has become so severe in some areas that legislatures, such as Massachusetts and California, have now legislated the use of toilets using less than the standard 3.5 gallons of water for flushing purposes.

This problem has been addressed, principally in the context of toilets used in public facilities that normally do not have toilet tanks but rather have metered flush valves or other mechanical or electrical shut-off devices in the water line.

It has also been proposed that the inlet water flow can be utilized to meter and limit the quantity of water that is received in the toilet tank fluid operated valve for use with a toilet tank was disclosed in U.S. Pat. No. 1,145,791 issued to L. F. Pigott on Jul. 6, 1915. The patent discloses a tank inlet valve assembly comprising an impeller screw seated in an inlet housing. The impeller is connected by a shaft to a screw, intermeshing with the screw is a second screw which is connected by a rod to a valve. The valve closes an outlet port. Attached to the second screw, at the side opposite the valve, is a spring that is under tension when the valve is closed. The valve is activated by pulling a flush handle. The flush handle rotates an arm that supports the rod having the valve on one end and the screw with spring assembly on the other. This rotation disengages the two screws allowing the spring to retract, pulling the second screw, rod and valve assembly rearwardly to open the outlet port. When the flush handle is released, the rod is pulled back into position by a spring, remeshing the first and second screws. As the valve is opened, fluid exits through the outlet port thereby allowing water to enter through the inlet port, turning the impeller which in turn drives the first screw, now intermeshed with the second screw, until the valve is closed.

U.S. Pat. No. 3,902,201, which issued to E. H. Bobo, Sep. 21, 1975 discloses a plumbing valve for use in flush tanks. This plumbing valve is an inlet valve opened by a link rod when the handle is turned to flush the toilet. The link rod depresses a valve follower and forces the valve, a ball, downwardly thereby compressing an underlying spring. This allows water to flow through the inlet linkage into a turbine housing containing a turbine wheel. The water flows through the turbine housing to an outlet to the toilet bowl and a second outlet which terminates within the tank, respectively. The flowing water causes the turbine wheel to rotate. As the turbine wheel rotates, through an undisclosed commercial linkage, it causes a cam to rotate. The cam surface maintains the downward pressure on the valve follower once it begins to rotate. When the cam has completed a rotation, so that a notch provided therein is directly above the valve follower, the valve follower is displaced upwardly by the spring seating the ball in the inlet neck thereby closing the inlet. To ensure, during initial water flow, that the valve follower is unable to reenter the notch in the cam, upon release of the toilet handle and before the cam has begun to rotate, a swing lever drops downwardly and retains the valve follower in a down position. The entire device requires a unique handle assembly precisely configured to the tank in which it is used. Inasmuch as flush tanks have many designs, the exact location of the handle, water inlet and tank outlet must be incorporated into the handle mechanism so that a number of interacting pieces of the mechanism perform their proper functions. Further, the disclosed 16:1 ratio of water exiting the turbine housing to the tank and bowl respectively limits the use of the device to toilets requiring very little water to maintain the flush action to evacuate the waste and clean the bowl.

U.S. Pat. Nos. 1,552,261; 1,809,440 and 4,624,444, of Belcher, Elder and Johnson, respectively, disclose metered flush valves that eliminate the need for a tank and are of a type normally found in public facilities. The patent of Belcher, U.S. Pat. No. 1,552,261, discloses a metering device consisting of a valve that opens into the water flow and is closed by a combination of a spring and water pressure. When the flush handle is turned, a mechanical linkage forces the valve open and locks it open by means of a ratchet. Water then flows through an impeller. The impeller is linked, by a series of gears, to a bar mechanism that is raised by the rotating impeller. The bar strikes the retaining ratchet tooth thereby disengaging it and allowing the valve to close.

U.S. Pat. No. 1,809,440, of Elder, also discloses a valve for stopping the water flow of water after a predetermined length of time or a predetermined quantity of water has passed. When the flush handle is rotated, paired inlet valves are opened to permit the water to flow. The flowing water strikes a turbine wheel. The turbine wheel is connected by a series of gears to a spiral gear that moves an arm to cause the rotation of the valves to a closed position. The patent of Johnson U.S. Pat. No. 4,624,444, is representative of shut-offs for flush toilets used in commercial establishments having pressurized lines.

Water control meters are also known for use in controlling watering devices. U.S. Pat. Nos. 4,280,530, of Yi, and U.S. Pat. No. 4,708,264, of Brunninga, are devices of this type. The device of Yi is placed in the water line for dispensing water to sprinklers or agricultural irrigation systems. Water enters through an inlet into an impeller chamber. The speed of rotation of the impeller is controlled by speed adjusting means, which is essentially a frictional contact. The water flows from the impeller chamber into a second chamber containing the outlet valve. The outlet valve is set on one of three preset positions. Thus, the flowing water rotates the impeller to rotate and an attached pinion gear initiates a gear train that terminates in a crescent gear. The crescent gear acts as a timing gear linked to the outlet valve and as it rotates, it slowly closes the valve to stop the flow of water. U.S. Pat. No. 4,708,264 of Brunninga, also discloses a timed water meter for a hose or sprinkling system. The outlet valve is set to a predetermined open position and water flowing through the system rotates an impeller which is linked through a series of planetary gears to rotate the valve control assembly. The valve control assembly rotates until released, at which time it permits the valve to be closed.

An electronic water controller is disclosed in U.S. Pat. No. 4,633,905 of Wang. As water flows over a water wheel, magnetic sensors within the wheel cross a relay thereby inputting the flow rate into a microprocessor. On the basis of the flow rate and the amount of water to be dispensed, the microprocessor computes the length of time that the outlet valve should be open. The outlet valve is opened by rotating a cam which in turn raises a post attached to the outlet valve. The outlet valve remains open until the calculated period of flow has been achieved at which time the motor rotates the cam to a point where the post is allowed to fall and the valve closed. The valve itself is forced into a closed position by a spring.

Another device for measuring a precise amount of water is that of Johns, U.S. Pat. No. 1,407,752. This is an in line measuring device that uses a combination of gearing and pressure differential associated with a piston to control the flow of water.

U.S. Pat. No. 4,335,852, of Chow, discloses another device for controlling the flow of fluid. A flow inlet has a valve therein which has an associated stem positioned to ride on a cam. The device is pre-set for a given amount of flow. The water flows by an impeller which is connected by means of intermeshing gears to an eccentric shaft that drives a pawl and rachet, the rachet being attached to a cam. The rachet rotates the cam until such time as the stem can be pushed back into the stem notch. In addition to relying on water pressure to close the valve, a spring is placed between the ferrule cup, in the inlet, and a stud in the center of the valve assembly. The sealing means is an O-ring, around the valve, that is slightly larger than the opening for the inlet valve.

SUMMARY OF THE INVENTION

According to the instant invention a toilet flushing system is provided precisely to control the amount of water permitted to enter the tank of a toilet, or water closet, during each flush cycle and prevent further entry of water into the tank after the flush cycle has been completed. The positive shut-off, metered water control system, which may be used in most, if not all, existing toilet tanks, comprises a stopper fitted to interrupt and shut off the flow of water from the source into the tank, a channel leading from the inlet, in which the stopper is positioned, to a vaned water wheel assembly and thence to an outlet tube such that, during water flow, the water wheel is caused to rotate. A worm gear, attached to the water wheel and rotating therewith, drivingly engages a spur gear that is part of a vertical intermediate gear assembly having a second worm gear on the lower end thereof. The worm gear of the intermediate gear assembly engages a spur gear of a ratchet gear which is seated in a ratchet/cam assembly. The ratchet/cam assembly controls the positioning of the stopper in either an open or a closed position.

When the toilet handle is turned, an actuating arm engages a ratchet, mounted on the ratchet/cam assembly, to rotate the cam approximately one-eighth of a complete rotation, without rotating the ratchet gear or any of the linked gear train to the water wheel. Thus, should a problem occur during the flush cycle, the ratchet/cam assembly can be rotated through a complete rotation, by turning the handle, to allow the inlet valve to close. During the initial rotation of the ratchet/cam assembly, the cam forces the stopper stem, which had been seated in a notch in the cam, in a downward direction thereby opening the inlet valve. Water flows around the stopper, through the inlet valve, up the channel and past the water wheel causing it to rotate. As the water wheel rotates, the intermeshing gears translate the rotary motion of the water wheel into a rotation of the cam. Upon a complete rotation of the cam, the notch again aligns with the stopper stem and pressure of the water entering the tank pushes the stopper upward thus closing the inlet valve. Upon closing of the inlet valve, the flow of water ceases with the water pressure keeping the inlet closed.

BRIEF DESCRIPTION OF THE DRAWINGS

The present invention will be better understood from the following detailed description of the invention taken in conjunction with the accompanying drawings in which like reference numerals refer to like parts and in which.

DESCRIPTION OF THE PREFERRED EMBODIMENTS

Figure 1:
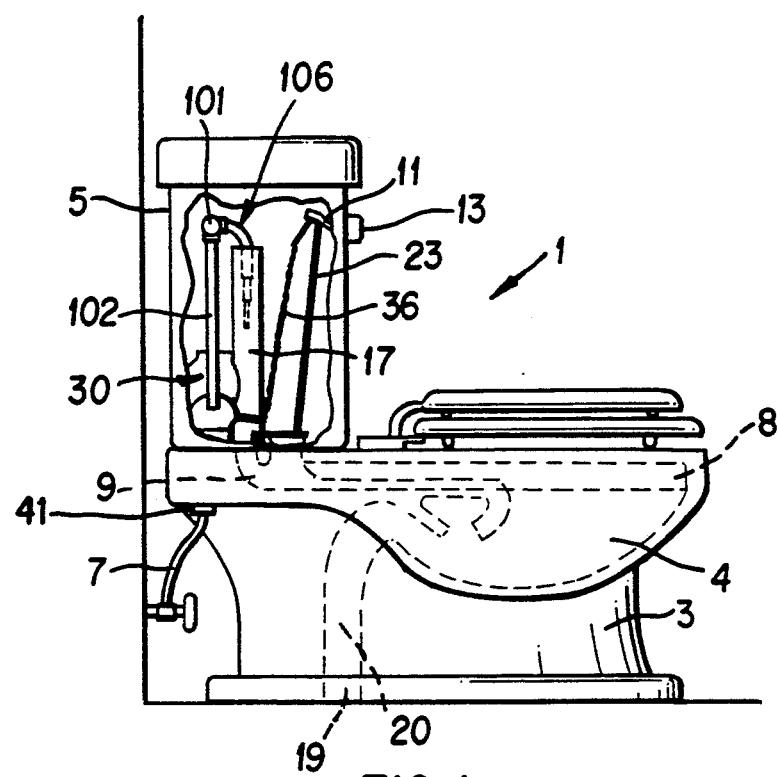
FIG. 1 is a side elevational view of a type conventional toilet, with the tank partially cut away to reveal its interior, incorporating the positive shut-off, metered water control system of the invention.
Figure 2:
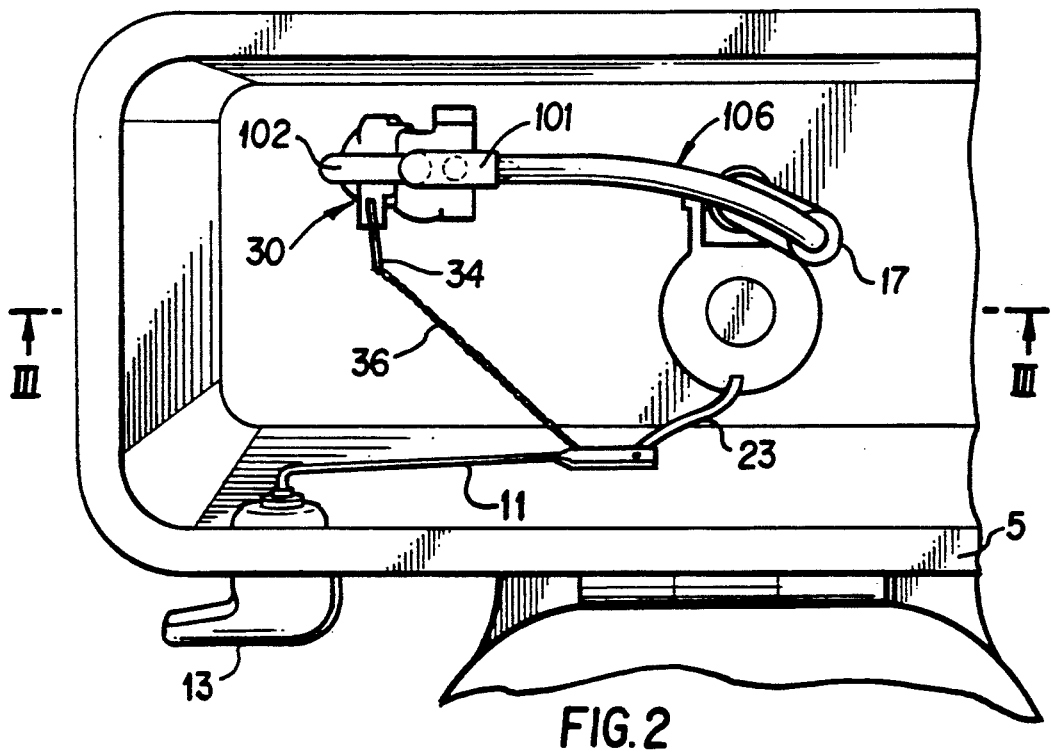
FIG. 2 is a top plan view of the principal portion of the toilet tank of FIG. 1 with the lid removed.
Figure 3:
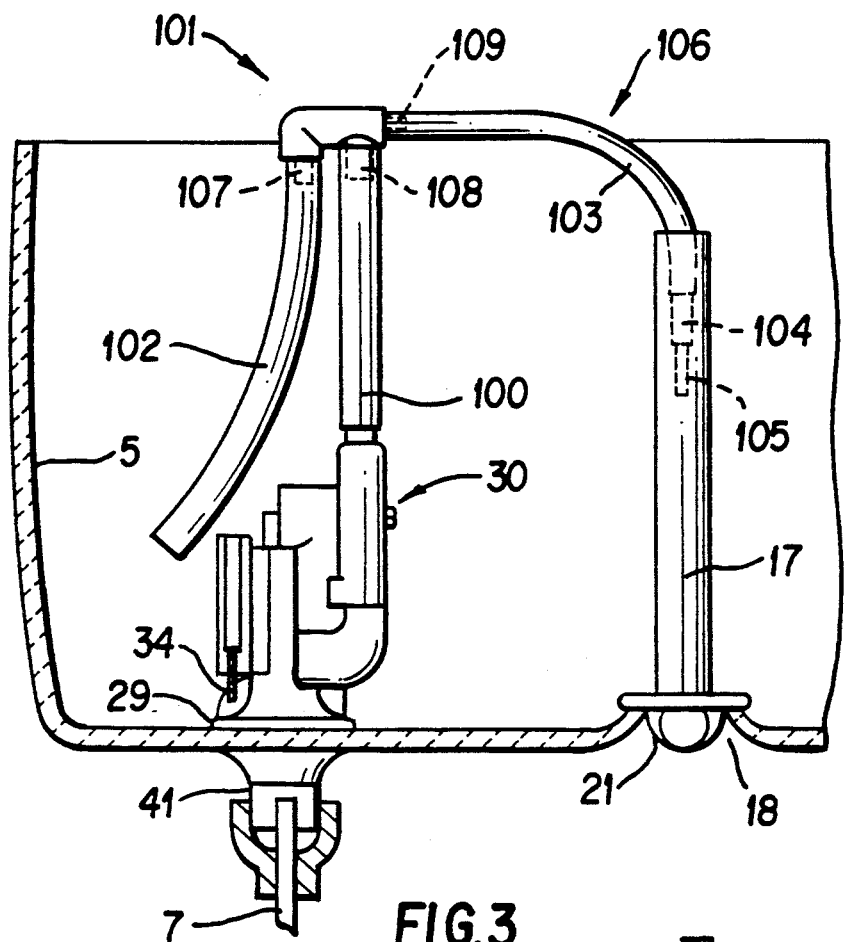
FIG. 3 is a partial sectional view taken on line III—III of FIG. 2.
Figure 17:
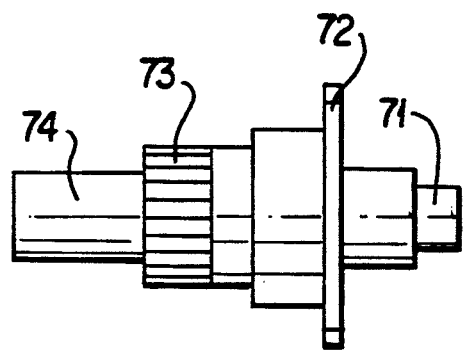
FIG. 17 is a side elevational view of the ratchet gear.
Figure 16:
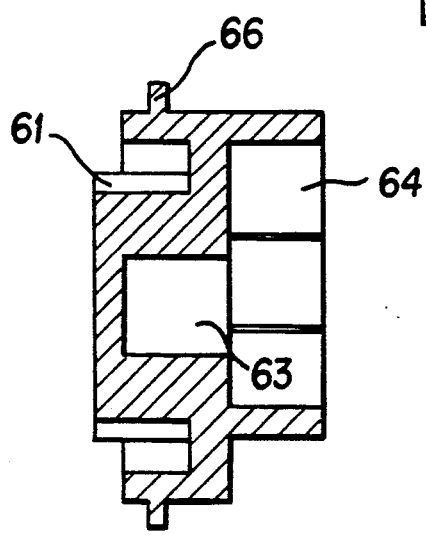
FIG. 16 is a cut away view along line A—A of FIG. 15.

FIG. 1 is a side view of a conventional toilet, of the general type, found in most American homes which is fitted with a water control assembly 30 in accordance with the invention. In the conventional home toilet, a ball cock assembly comprising a float arm and ball is mounted at the upper end of a water tube for closing an inlet valve via a mechanical linkage when the tank is filled to a predetermined level. In the present invention this assembly, to include the inlet valve and float arm and ball, is removed and replaced with a positive shut-off, metered water control system, which may be placed above or below the water line of a filled tank.

The illustrated toilet comprises a toilet bowl 4 and pedestal 3 with a tank 5 mounted, either as part of or removably, over the rear extension of toilet bowl and pedestal 3. Water is introduced by means of a supply water line 7, which is connected by known means to inlet fitting 41 of water control assembly 30. Water received in tank 5 which exceeds the tank's design capacity spills into an overflow tube 17, wherefrom it is received in a conduit 9 formed at the rear of bowl 4, and into an oval channel 8, formed in the rim portion of bowl 4, having spaced openings along its lower side to introduce water into bowl 4. The main tank outlet 18 is normally closed by a flapper valve 21. When water from overflow tube 17 or tank outlet 18 or both is introduced into toilet bowl 4, the level of water in bowl 4 is raised until it exceeds the generally "S" shaped trap 20 of waste outlet 19 causing the water to flow from bowl 4 by siphoning action. Water, and waste products, continue to flow from bowl 4 as long as sufficient water enters bowl 4 through bowl inlet 9 to maintain the seal that causes the vacuum pumping or siphoning action of the bowl contents.

Figure 5:
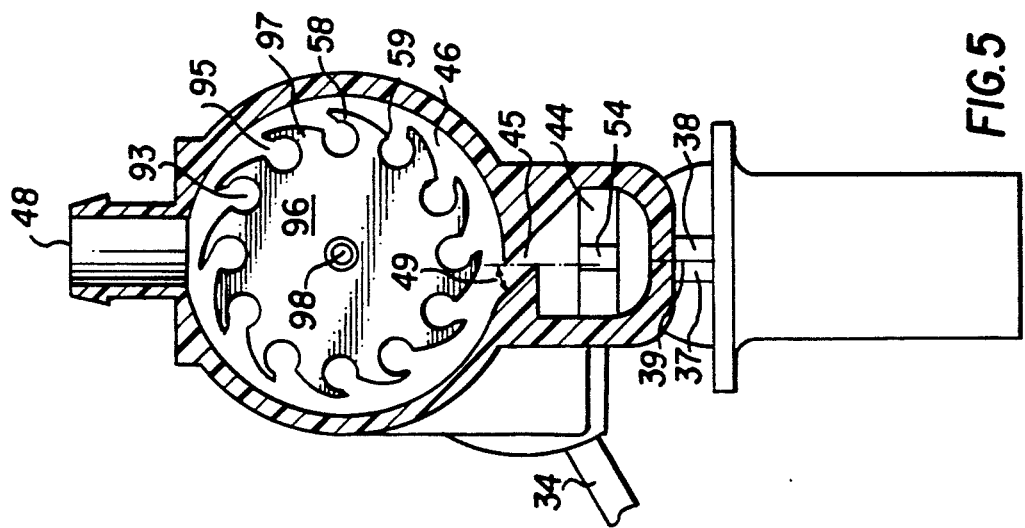
FIG. 5 is a sectional view of the water control assembly along taken on line V—V FIG. 4.
Figure 11:
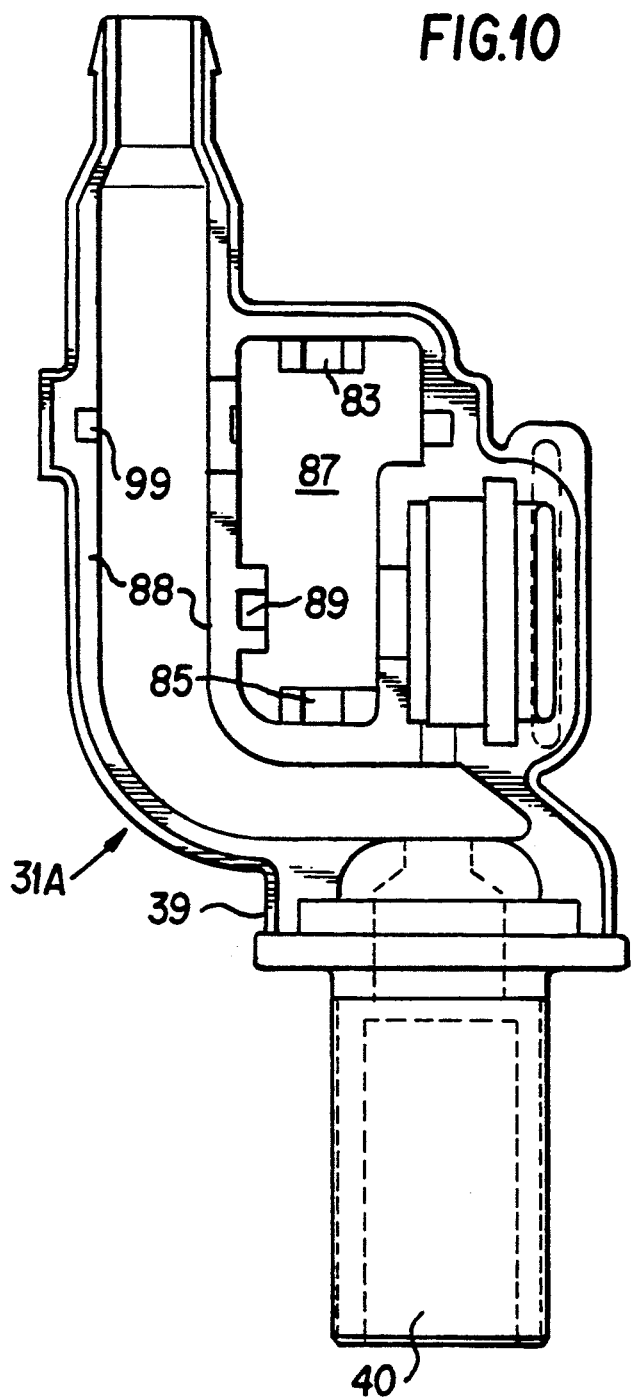
FIG. 11 is a cut away view of one section of the housing assembly.
Figure 12:
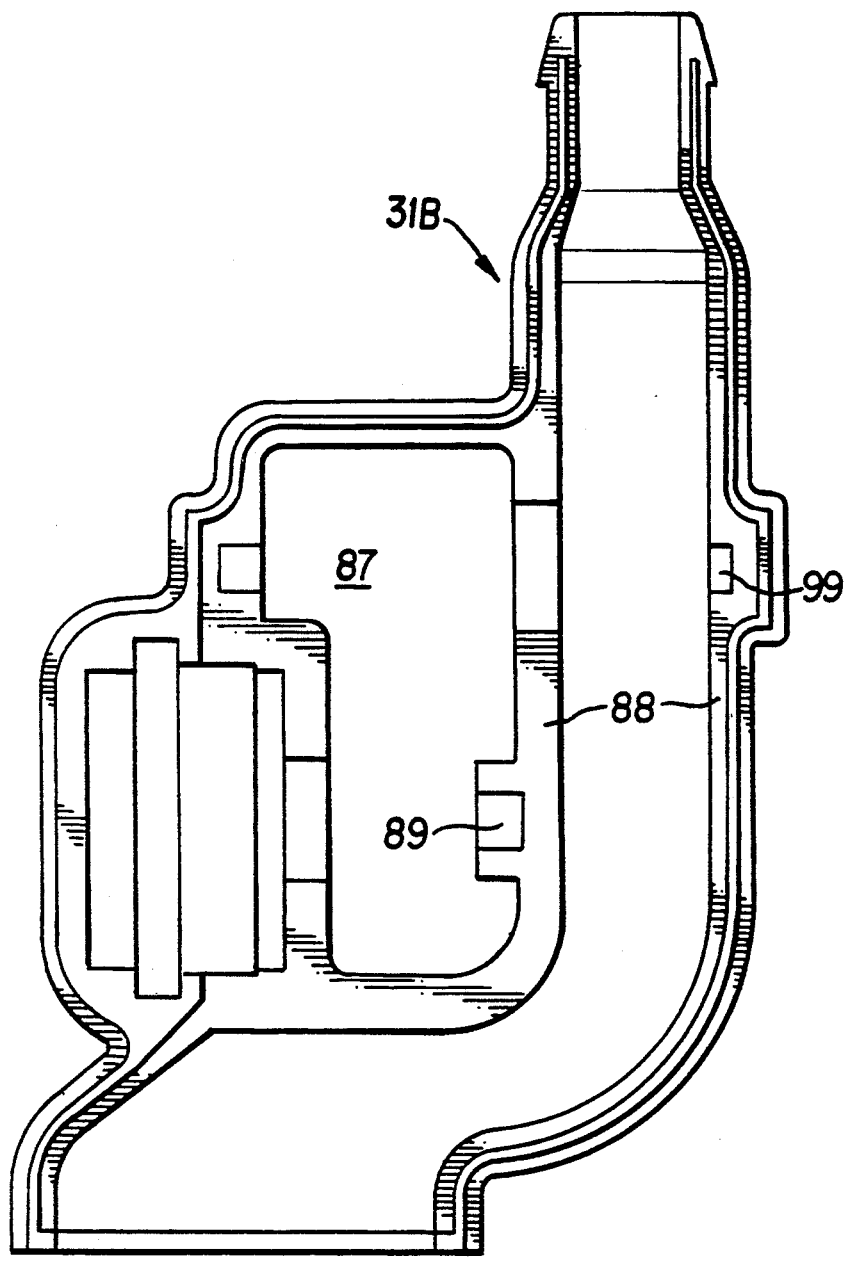
FIG. 12 is a cut away view of the second section of the housing assembly.
Figure 13:
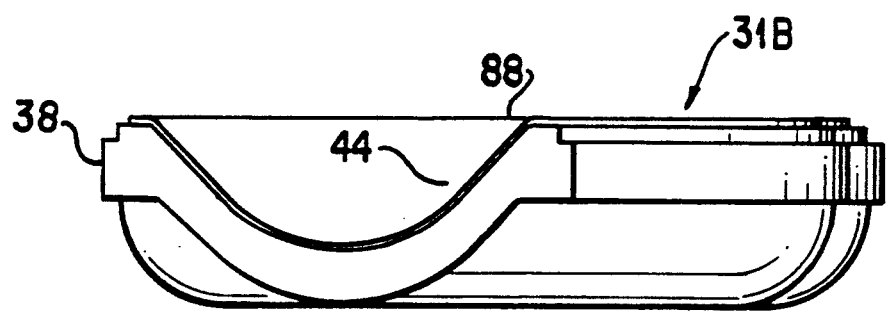
FIG. 13 is a bottom plan view of the base portion of FIG. 12.

FIGS. 4-8 are illustrations of control assembly 30 of the positive shut-off, metered water control system according to the preferred embodiment of the present invention and FIGS. 10-17 are detailed illustrations of specific components. Although the preferred embodiment is intended to permit the entry of 3.5 gallons of water into the system, modifications will be appreciated from the description which may be made to control assembly 30 to provide a range of permissible flows between one half and six gallons of water. Housing 31 is preferably molded in at least two sections, sections 31A and 31B as shown in FIGS. 11 and 12, of a plastic material that may be sealed along, as shown in FIG. 5, junction 39, a portion of which being partially defined by flanges 37 and 38, by means of sonic welding. Sealing of the housing is necessary to meet the plumbing requirements for "anti-siphoning" when the control assembly is mounted below the tank water line. The composition used for housing 31 may be either transparent or opaque. In the preferred embodiment housing 31 is transparent.

Handle 13 is connected to lever arm 11. Attached to lever arm 11 are flapper valve link 23 and start arm link 36. When handle 13 is turned counterclockwise, or in a downward direction, lever arm 11 is raised to lift, through linkages 23 and 36, flapper valve 21 and start arm 34, respectively.

Attached at the bottom of housing 31 is inlet fitting 41. Inlet fitting 41 is a standard sized fitting, as currently used with flush tanks, to provide a sealable mount 29 at the bottom of the tank and for attachment of water line 7 by known means. The annular dimension of inlet 40 is slightly smaller at the top than at the bottom and matches the opening into housing 31. Positioned just below the point of constriction in inlet 40 is air cushion 42. Air cushion 42, comprising a foam composition or a hollow collar filled with air or compressible fluid, is permanently affixed to the inner surface of inlet fitting 41. Air cushion 42 retains stopper 50 in housing 31, should water pressure be lost in water line 7, and provides a means for absorbing a portion of the shock, known as "water hammer," that results when the flow of water stops at the end of the flush cycle. Inlet 40 further narrows, at inlet opening 43, in the lower portion of housing 31 to become flow channel 44. Flow channel 44 directs the flow of water from inlet opening 43 to chamber 46. Entry into chamber 46 is by means of angled inlet 45. Angled inlet 45 is inclined at angle 49 of 52° from vertical. The width of angled inlet 45, in the preferred embodiment, is approximately 0.175 inches. Varying the width, by widening or narrowing, of angled inlet 45 during the molding process increases or decreases, respectively, the quantity of water flowing through the system in one flush cycle. Outlet 48, atop chamber 46, permits the water to exit the housing into a main tube 100.

Mounted, by means of axle 91 seated in recesses 92 and 99 in walls 88 of housing 31, is water wheel assembly 90. Axle 91 is slidably received in a passageway that defines the longitudinal center axis of water wheel assembly 90. At one end of axle 91, mounted in recess 99, is ear 98 which maintains the position of water wheel assembly 90 on axle 91.

Figure 14:
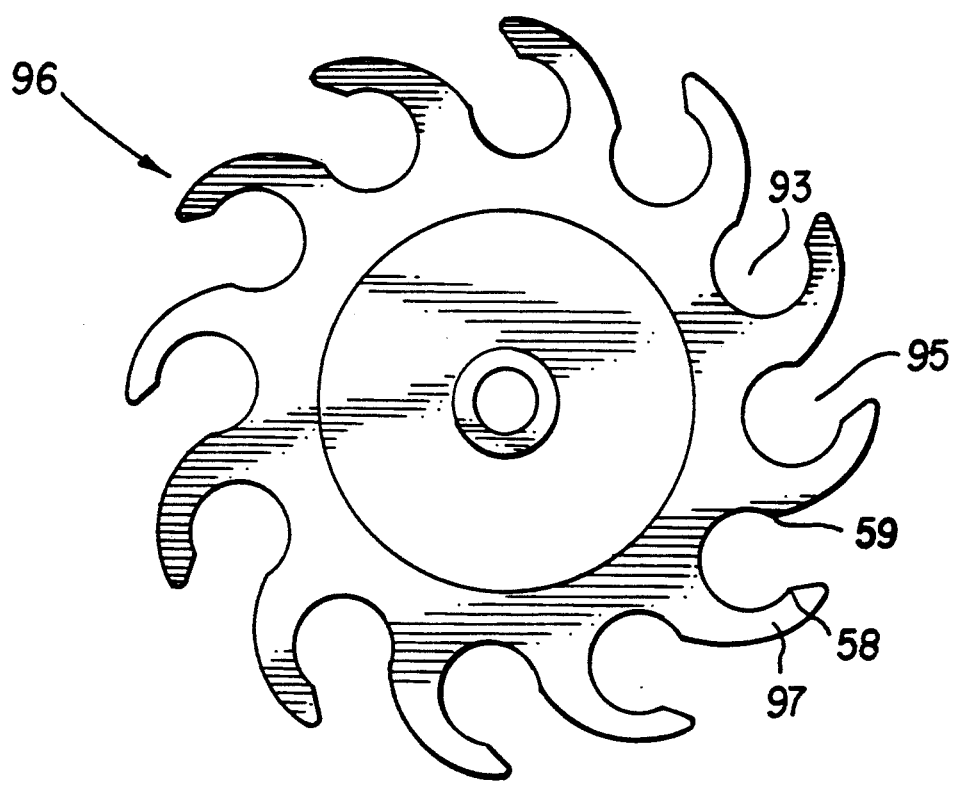
FIG. 14 is a side elevational view of the water wheel.
Figure 15:
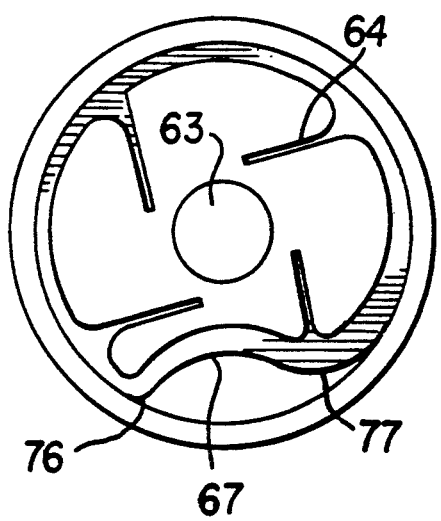
FIG. 15 is a side elevational view of the cam portion of the ratchet/cam assembly.

Water wheel 96, part of water wheel assembly 90, is centered and freely rotatable within chamber 46. Twelve vanes 97 extend from water wheel 96. As shown in FIG. 14, vanes 97 have smooth flowing surfaces with defined edges 58 and 59 created by gap 95 in circular chamber 93. The angularity and chamber combination of vanes 97 amplifies the effect of the flowing water on water wheel 96 to produce rotation over a great range of water pressures. Gap 95, from chamber 93, subtends an arc of approximately 90°.

Extending from water wheel 96, along the longitudinal axis of rotation, is the remainder of water wheel assembly 90 having centered therein worm gear 94. Mounted transverse to the longitudinal axis of rotation of water wheel assembly 90 is intermediate gear 80. Intermediate gear 80 is rotatably mounted within housing 31 by means of mounting ears 81 and 82. Mounting ears 81 and 82 are seated in recesses 83 and 85 in walls 88 of housing 31. At the upper end of intermediate gear 80 is spur gear 84. Spur gear 84 intermeshes with worm gear 94 of wheel assembly 90. At the lower end of intermediate gear 80 is worm gear 86.

Extending transverse to intermediate gear 80 and lying directly below and parallel to the longitudinal axis of rotation of water wheel assembly 90 is ratchet gear 70. Ratchet gear 70 is supported by means of mounting ear 71, mounted in recess 89 in wall 88 of housing 31, and rib gear 73. Rib gear 73 is slidably received in ratchet gear housing 62 of ratchet/cam assembly 60. Ratchet gear stub 74 is slidably received in stub receptacle 63 of ratchet/cam assembly 60 so that ratchet/cam assembly 60 rotates with ratchet gear 70 when rotation of the assembled gear train is initiated by flowing water rotating water wheel 96. Attached to ratchet gear 70 is spur gear 72 that intermeshes with worm gear 86 of intermediate gear 80 to complete the gear train. Ratchet/cam assembly 60 is rotatably mounted in housing 31 so that its outer surface, containing ratchet teeth 61, may be engaged by pawl 35 of start arm 34. Pawl 35 is seated between ratchet teeth 61 and retention ring 69. However, when pawl 35 engages ratchet teeth 61 to rotate ratchet/cam assembly, rib gear 73 is not engaged and stub receptacle 63 rotates freely around ratchet gear stub 74. Seal 65, between cam assembly lip 66 and housing 31, prevents tank water from entering into the interior of housing 31.

Figure 4:
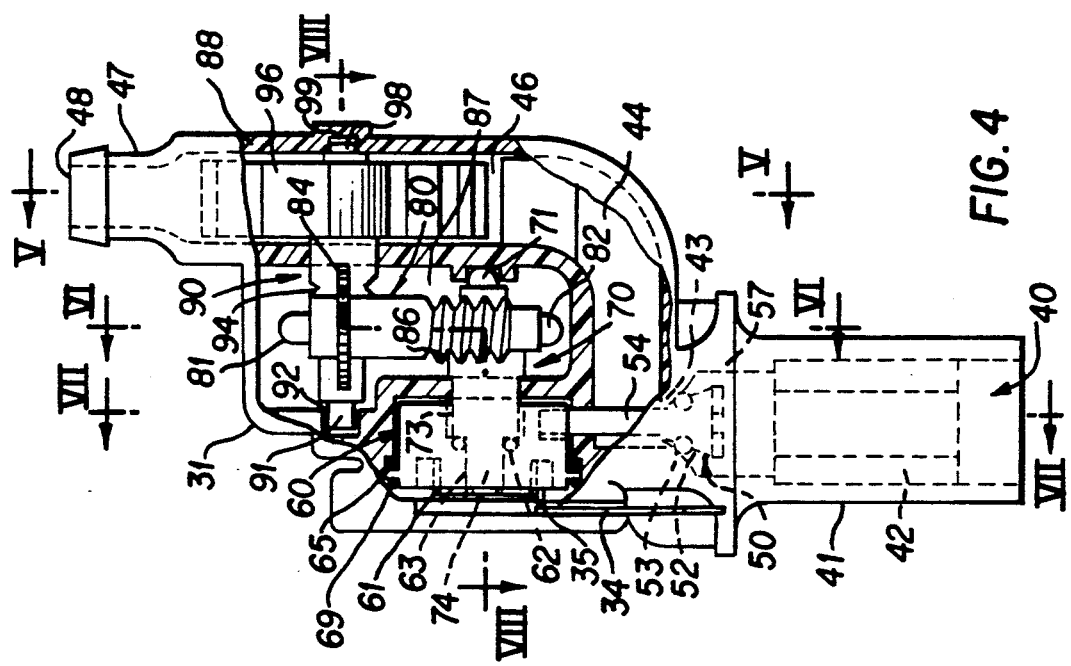
FIG. 4 is a partial sectional side elevational view of the water control assembly.

As partially indicated in FIG. 4, each rotatable part, i.e., water wheel assembly 90, intermediate gear 80, ratchet gear 70, and cam assembly 60, are supported by walls 88, either exterior or interior, that define chambers 87 for receiving the rotatable parts. Chamber 46 for water wheel 96 being another such chamber. The open interior allows water to flow through the interior of housing 31 and particulates contained therein to bypass the loosely fitted engaging gear parts. Between flush cycles, the particulates settle in the chambers until the next flush cycle at which time they will be forced through the assembly and out into the tank or bowl.

Attached to outlet extension 47 is main tube 100. Attached at the top of main tube 100 is right elbow manifold 101. Input extension 108 of right elbow manifold 101, attached to the upper end of main tube 100, has an inner diameter of 0.375 inch. Elbow manifold 101 has extending downwardly and parallel to its connection to main tube 100, tank extension 107 having an inside diameter of 0.438 inch. The external dimensions of extensions 107 and 108 are the same. Tank fill tube 102 is attached to tank extension 107. Attached, by means of bowl extension 109, at the end of right elbow manifold 101 opposite to the connection to tank fill tube 102 and at right angles thereto, is overflow or bowl fill tube 103 of bowl fill assembly 106. Bowl extension 109 has an inner diameter of 0.375 inch. Input extension 108 has thicker walls than both tank extension 107 and bowl extension 109.

The free end of bowl fill assembly 106 is inserted in overflow tube 17. Bowl fill assembly 106 comprises bowl fill tube 103 and optional flow control inserts 104 and 105.

Tubes 100 and 102 are plastic tubes having an interior diameter of approximately one half inch. Bowl fill tube 103 has an interior diameter of three-eighths of an inch and flow control inserts 104 and 105 have interior diameters of one-quarter inch and three-sixteenths inches, respectively. Flow control inserts 104 and 105 are retained in bowl fill tube assembly 106, when used, by frictional contact between their outer surface and the inner surface of the tube in which they are inserted.

When bowl fill tube assembly 106 comprises all three components 103, 104 and 105, one half gallon of water, of the 3.5 gallons of water flow permitted by the preferred embodiment, feeds directly into the toilet bowl. When bowl fill assembly 106 consists only of bowl fill tube 103 and flow control insert 104, one gallon enters the toilet bowl, and when only bowl fill tube 103 is used, one and a half gallons of water is fed directly into the toilet bowl. This allows the positive shut-off, metered water control system to be adjusted for varying configurations of toilet bowls and "S" traps to ensure the proper bowl filing takes place.

Seated within inlet 40 of housing 31 is stopper 50. Stopper base 51 is of slightly smaller cross-section than is the upper portion of inlet 40. Attached to the bottom of stopper base 51 are four positioning arms 57, each arm offset at a 90° angle from adjacent arms for centrally positioning stopper 50 in the upper portion of inlet 40. Near the top of stopper base 51 is notch 52 containing O-ring seal 53. Stopper stem 54 extends upwardly, from stopper base 51, into flow channel 44 and thence through an opening in wall 88 of housing 31 to engage the surface of cam 56

Figure 7:
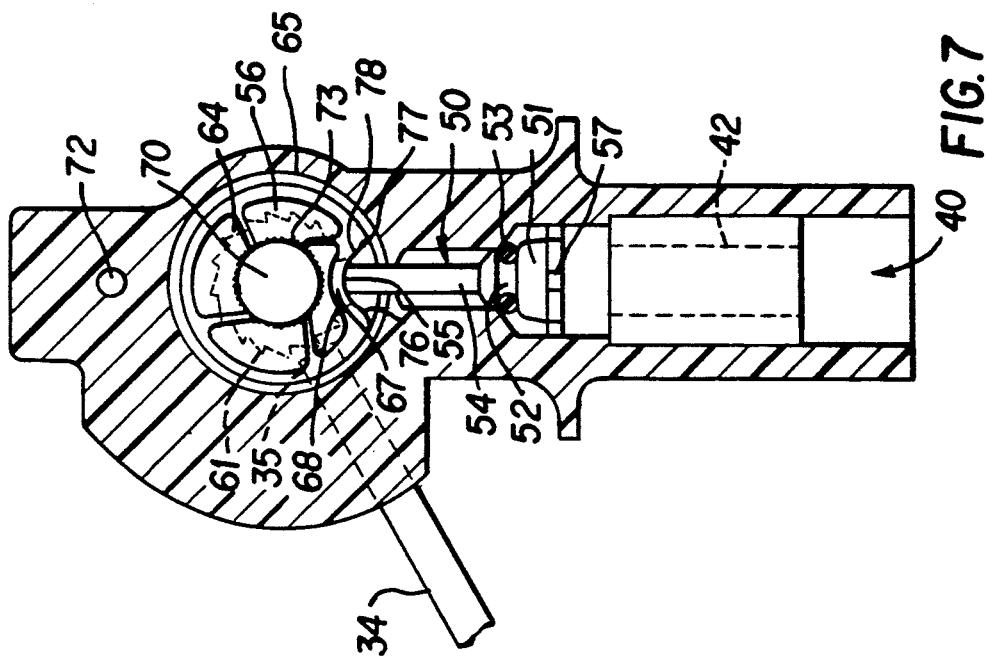
FIG. 7 is a sectional view taken on line VII—VII of FIG. 4.
Figure 6:
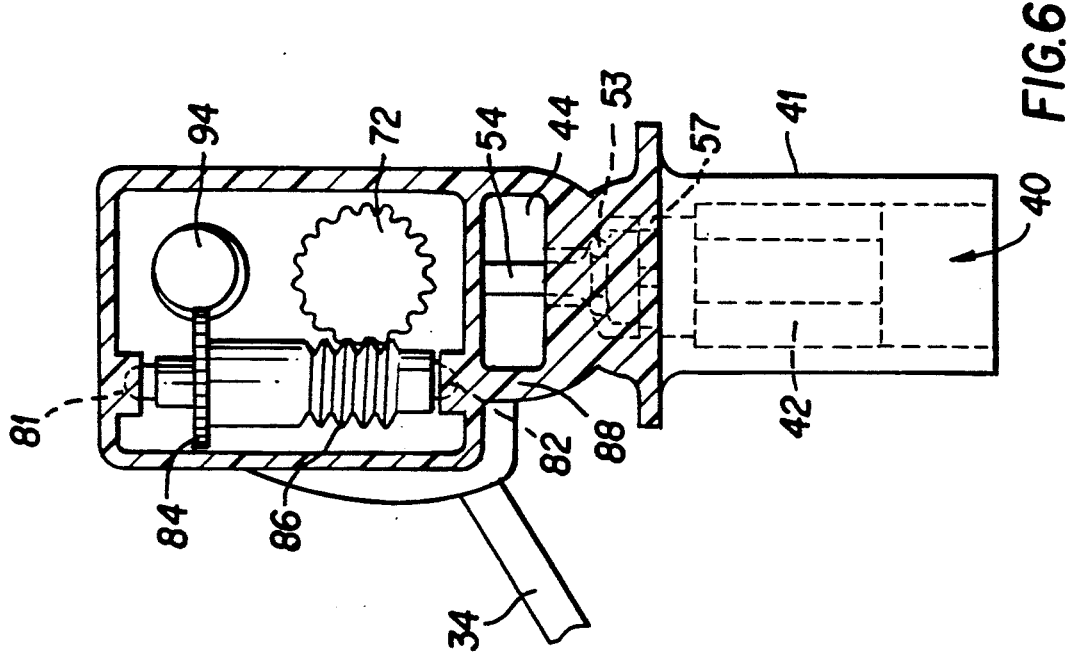
FIG. 6 is a sectional view taken on line VI—VI of FIG. 4.
Figure 8:
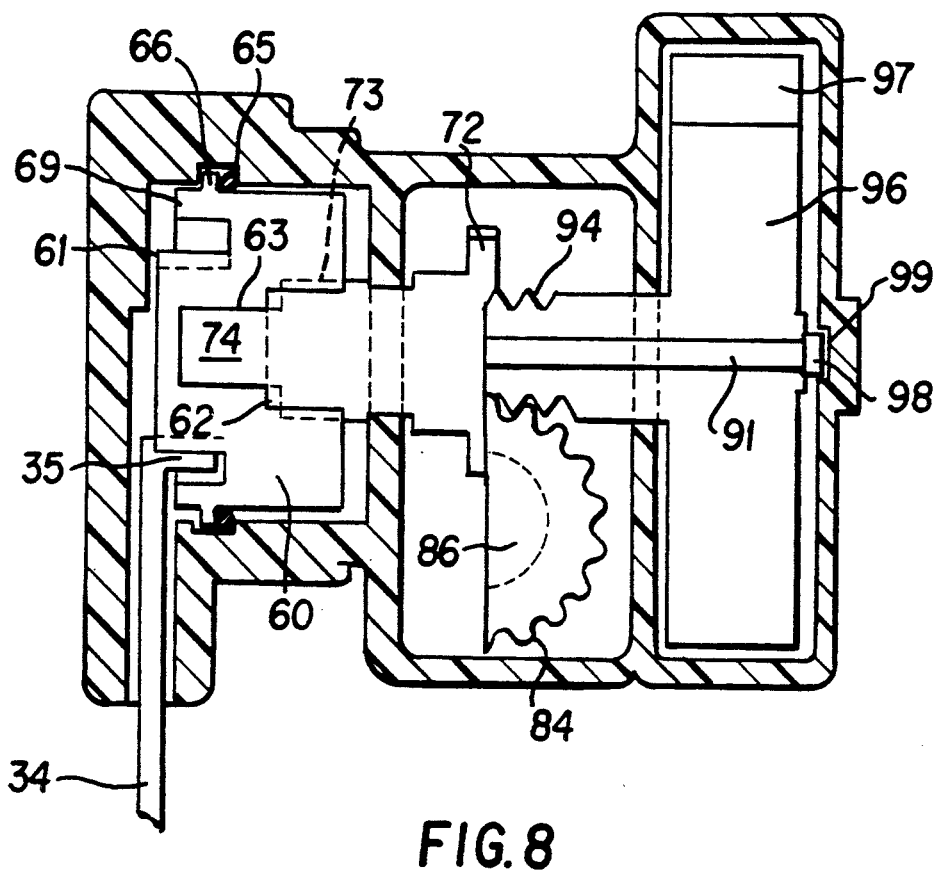
FIG. 8 is a sectional view taken on line VII—VII as indicated in FIG. 4.
Figure 9:
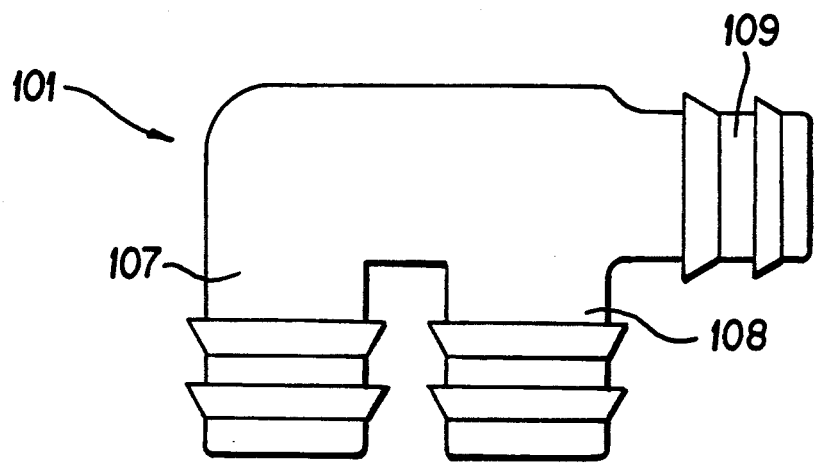
FIG. 9 is a side elevational view of the bowl fill manifold.
Figure 10:
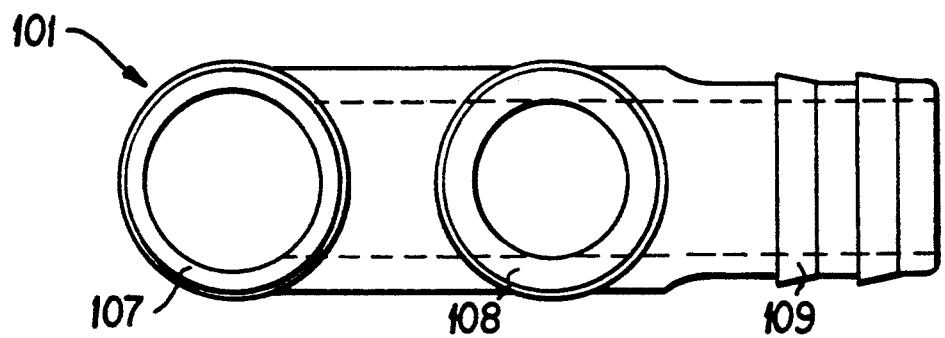
FIG. 10 is a bottom plan view of the bowl fill manifold shown in FIG. 9.

Cam 56, in the preferred embodiment of a three and a half gallon water system, has one cam repeat 68. Cam repeat 68 is a smoothly connected series of interconnected arcs, with the most inboard point, being defined by arc 67. When stopper end 55 is engages the outboard surface 77 of arc 67, as shown in FIG. 7, there is no flow of water into the tank. Merging into arc 67 is smaller arc 76. The curved surface defined by the connecting arc 76 and outboard surface 77 of arc 67 of cam repeat 68 prevents an abrupt closure of stopper 50 further to reduce "water hammer." However, the closing is not so gradual that it reduces the pressure of flowing water to the point where turbine water wheel 96 is no longer caused to rotate before the closure is complete. The surface of arc 78, defining the outboard surface 77 of arc 67, permits a smooth and gradual opening of stopper 50 upon initiation of the flush cycle. Arcs 67 and 78 are centered on a circle having a one-half inch radius and arc 76 has a radius of one-eighth of an inch.

To operate the system, handle 13 is depressed to lift lever arm 11. Lever arm 11, by means of flapper valve link 23, lifts flapper valve 21 to open tank outlet 18. Water flows from outlet 18 of tank 5 until the water level drops below the underside of flapper valve 21. At that point, flapper valve 21 falls, closing tank outlet 18 and tank 5 begins to refill. Simultaneous with the lifting of flapper valve 21, lever arm 11, through start arm link 36, lifts start arm 34. Pawl 35, of start arm 34, engages a tooth 61 of the ratchet that is an integral part of ratchet/cam assembly 60. Pawl 35 remains engaged, during the depression of handle 13, to tooth 61 with the turn ratchet/cam assembly 60 through approximately one-eighth of a complete rotation. The mating of ratchet gear 70 to cam assembly 60, as shown in FIG. 7, permits ratchet/cam assembly 60 to rotate without rotating ratchet gear 70 and the remaining intermeshing gears during the initial one eighth rotation of ratchet/cam assembly 60. The rotatable mating of ratchet/cam assembly 60 to ratchet gear 70 permits, should a problem develop during the water flow cycle such as the toilet becoming stopped up or a similar occurrence, ratchet/cam assembly 60 to be rotated independently, by means of the linkage between handle 13 and start arm 34, until stem top 55 of stopper 50 is reseated against the surface of arc 67 of cam repeat 68 thereby shutting off the flow of water.

Ratchet gear 70 has rib gear 73 engagingly received in ratchet gear housing 62 by ribs 64 such that ribs 64 pass over the teeth of rib gear 73 during the rotation of ratchet/cam assembly 60, by pawl 35, and are engaged by the teeth of rib gear 73 once water begins to flow. As ratchet/cam assembly 60 rotates, notch surface 77 of cam repeat 68 is rotated across stem top 55 of stopper 50 forcing stopper 50 downwardly and breaking the seal between O-ring seal 53 and inlet opening 43 to permit water to flow into flow channel 44. Water, now flowing through flow channel 44, is deflected by flow nozzle 45 to strike vanes 97 of water wheel 96 causing water wheel 96 to rotate, the water wheel rotation to cam rotation ratio being 784:1. The water flows around the outer surface of chamber 46 and out outlet 48 into main tube 100. In right elbow manifold 101, the water is diverted into tank fill tube 102 and bowl fill assembly 106. The ratio of water directed to the bowl and that directed to the tank is determined by bowl fill assembly 106. When bowl fill assembly 106 consists of bowl fill tube 103 and flow control inserts 104 and 105, one half gallon, as indicated above, of the three and a half gallons of water permitted to flow through the system, will be directed to the bowl and three gallons directed to the tank for a six to one ratio. When bowl fill assembly 106 consists of bowl fill tube 103 and flow control insert 104, the ratio is five to two and when bowl fill assembly 106 consists only of bowl fill tube 103, the ratio is four to three.

As water wheel 96 rotates in a clockwise direction, so too does associated worm gear 94 which intermeshes with spur gear 84 of intermediate gear 80. The rotation of intermediate gear 80, via worm gear 86 and intermeshing spur gear 72 of ratchet gear 70, is transferred to ratchet/cam assembly 60 by means of the engagement of the teeth of rib gear 73 of ratchet gear 70 and ribs 64 of ratchet/cam assembly 60. Thus, ratchet/cam assembly 60 continues its rotation until notch arc 67 of cam repeat 68 again is positioned directly above stem top 55. At that point, the pressure of the flowing water striking the underside of stopper base 51 forces stopper 50 upwardly so that stem top 55 again rests proximate to or against notch arc 67 of cam repeat 68 with the result that inlet opening 43 is sealed and water flow ceases.

In the embodiment disclosed, the gear ratio of 784:1 and the size of the opening of flow nozzle 45 combine to provide a water flow through the system of three and a half gallons. Placing a second cam repeat 68, offset 180° from notch surface 77 in ratchet/cam assembly 60, produces a flow control meter for one and three quarters gallons. By adjusting the size of flow nozzle 45, during the molding of housing 31, lessor or greater of flow volume can be provided. Additional cam repeats 68 can be placed in cam 66 to create other metered flows in response to legislative requirements or toilet design considerations. Thus a positive shut off, metered water control system for one half to six gallons of water flow may be produced using the inventive concept.

Construction of the internal parts, that is, the stopper 50, water wheel assembly 90, intermediate gear 80, rachet gear 70, and ratchet/cam assembly 60, and right elbow manifold 101 may be by injection molding using appropriate compositions. The start arm 34 is normally composed of a stainless steel, for durability, and is the only metal part of the device. Plastic tubing, of the necessary rigidity and dimensions, is used for tubes 100, 102 and 103 and flow control inserts 104 and 105.

The drawings of FIGS. 4 through 9, although not strictly to scale, are a close approximation of the necessary dimensional relationships.

Although some embodiments of the invention have been described above by way of example only, and preferred techniques of manufacture have been enumerated, it will be understood by those skilled in the field that modifications or other techniques may be made to the disclosed embodiment without departing from the scope of the invention which is defined by the appended claims.

What I claim to be secured by letters patent of the United States is:

1. A positive shut-off, metered water control system for use with flush toilet tanks comprising:
   a housing assembly;
   an inlet means attached to said housing assembly for mounting said control in the flush tank and providing a connection to a source of water under pressure;
   an outlet on said housing assembly;
   flow control means for alterably direction the flow of water between the toilet tank and the toilet bowl, said flow control means removably attached to said outlet;
   stopper means mounted in an upper portion of said inlet means, said stopper means capable of movement between said sealed and open positions for shutting off or permitting water flow;
   an air cushion, said air cushion affixed in said inlet means below said stopper means;
   flow channel means within said housing assembly for directing the flow of water when said stopper means is in an open position;
   start means for placing said metered water control system into operation;
   an impeller rotatably mounted in a cavity portion of said flow channel means in said housing assembly between said inlet fitting means and said outlet;
   cam means for controlling said positions of said stopper means, said cam means being linked to said start means; and
   linkage means for transferring the rotation of said impeller into a rotation of said cam means;
   an input tube, said input tube removably attached at its lower end to said outlet on said housing assembly;

a manifold, said manifold having three extensions, a first extension attached to an upper end of said input tube, said first extension in the center of said manifold; a second extension, said second extension to one side of and extending parallel to said first extension; a third extension at a right angle to said first and second extensions;

a master tube, said master tube attached to said third extension;

a first step down means for reducing the flow of water to a toilet bowl, said first step down means slidably and removably received in the end of said master tube opposite said attachment to said third extensions; and a second step down means for further reducing the flow of water to a toilet bowl, said second step down means slidably and removably received in said first step down means.

2. A positive shut-off, metered water control system as claimed in claim 1 wherein said linkage means allows said cam means to be rotated by said start means without transferring the rotation to said impeller.

3. A positive shut-off, metered water control system as claimed in claim 1 wherein said linkage means further comprises:

a first worm gear rigidly attached to said impeller, said worm gear lying along and centered on the axis of rotation of said impeller;

an intermediate gear, said intermediate gear being transverse to said axis of rotation of said impeller and having a spur gear at its upper aspect and a second worm gear at its lower aspect, said spur gear rotatably meshed with said first worm gear; and a ratchet gear, said ratchet gear lying below and parallel to said rotary axis of said impeller and having a spur gear on a forward aspect, said spur gear rotatably meshed with said second worm gear, and a rearward aspect mated to said cam means, said mated rearward aspect permitting rotation of said impeller to be transferred to said cam means but transfer of rotation of said cam means by said start means to said impeller is precluded.

4. A positive shut-off, metered water control system as claimed in claim 1 wherein said stopper means is positively engaged to said cam means by water pressure.

5. A positive shut-off, metered water control system as claimed in claim 1 wherein said housing assembly is molded from a plastic material amenable to sonic welding and said stopper means, impeller, cam means, linkage means, and manifold are injection molded.

6. A water flow control system for use with flush toilet tanks, said control system comprising:

a housing, said housing formed of at least two sections;

an inlet into said housing, said inlet providing means for mounting said control system in a toilet tank and for attachment to a water source;

an outlet from said housing;

a water flow channel between said inlet and said outlet;

a turbine chamber, said turbine chamber a part of said water flow channel;

a turbine wheel, said turbine wheel rotatably mounted in said turbine chamber;

a stopper, said stopper movably seated in said inlet;

an air cushion means for retaining said stopper in said housing when water pressure is lost and for reducing "water hammer";

a ratchet/cam means for starting a flush cycle;

a stem of said stopper engagingly received by a cam of said ratchet/cam means;

a start arm, said start arm having a pawl for engaging a ratchet of said ratchet/cam means; and a linkage means between said turbine wheel and said ratchet/cam means for transferring the rotation of said turbine wheel into a rotation of said ratchet/cam means wherein said ratchet/cam means can be cycled by said pawl's repeated engagement of said ratchet of said ratchet/cam means without engagement of said linkage and transfer of rotation to said turbine wheel thereby providing a positive means for shutting off the flow of water.

7. A water flow control system as claimed in claim 6 further comprising a flow distribution means for dividing the flow of water between a feed to the flush toilet's bowl and the toilet tank, said flow distribution means removably attached to said outlet.

8. A water flow control system for use with flush toilet tanks comprising:

a housing;

an inlet to said housing;

an outlet from said housing;

a flow channel between said inlet and said outlet;

a rotatable water wheel mounted in a wheel chamber in said flow channel;

a stopper slidably received in said inlet;

a start means for forcing said stopper into an open position thereby allowing water to flow;

a linkage means between said water wheel and said start means wherein said start means and said linkage means are disengagingly connected such that rotation of said start means is not imparted to said linkage means but rotation of said water wheel is imparted by said linkage means to said start means;

a flow distribution means for dividing the flow of water between a feed to the flush toilet's bowl and the toilet tank, said flow distribution means removably attached to said outlet;

an outlet tube, said outlet tube removably attached at one end to said outlet;

a manifold, said manifold having three extensions and being removably attached by a first of said three extensions to the end of said outlet tube opposite said outlet;

a tank fill tube, said tank fill tube removably attached to a second of said three extensions;

a bowl fill assembly removably attached to a third of said three extensions;

a bowl fill tube, said bowl fill tube providing the removable attachment to said third of three extensions;

a first flow control insert slidably and removably received in an end of said bowl fill tube opposite said attachment to said third of said three extensions and retained in said end by friction; and a second flow control insert slidably and removably received in an end of said first flow control insert and retained therein by friction.

9. A water flow control system as claimed in claim 8 further comprising reduction means for reducing "water hammer," said reduction means comprising a combination of an air cushion, said air cushion mounted in said inlet below said stopper and further serving as means to retain said stopper in said inlet should water pressure be lost and a steeply inclined surface of a notch in a cam of said start means, a stem of said stopper engaging said steeply inclined surface to provide a slower closing of said stopper.

* * * * *